(12) United States Patent
Biddell

(10) Patent No.: US 8,399,805 B2
(45) Date of Patent: Mar. 19, 2013

(54) ANTI-FOGGING DEVICE AND ANTI-FOGGING VIEWING MEMBER

(75) Inventor: Michael Philip Biddell, Staffordshire (GB)

(73) Assignee: NEL Technologies Limited, Westway Industrial Park, Throckley Newcastle upon Tyne, Northumberland (GB)

( * ) Notice: Subject to any disclaimer, the term of this patent is extended or adjusted under 35 U.S.C. 154(b) by 1091 days.

(21) Appl. No.: 12/092,655

(22) PCT Filed: Nov. 8, 2006

(86) PCT No.: PCT/GB2006/004179
§ 371 (c)(1),
(2), (4) Date: May 5, 2008

(87) PCT Pub. No.: WO2007/054694
PCT Pub. Date: May 18, 2007

(65) Prior Publication Data
US 2008/0290081 A1    Nov. 27, 2008

(30) Foreign Application Priority Data
Nov. 8, 2005  (GB) .................................. 0522784.8

(51) Int. Cl.
*H05B 3/28* (2006.01)
*A42B 3/24* (2006.01)
(52) U.S. Cl. ..................... 219/203; 219/522; 219/528
(58) Field of Classification Search .................. 219/203, 219/522, 526, 536, 543, 549
See application file for complete search history.

(56) References Cited

U.S. PATENT DOCUMENTS

| | | | |
|---|---|---|---|
| 2,166,108 A | 7/1939 | Jensen | |
| 3,594,547 A * | 7/1971 | Quinn | 219/529 |
| 3,636,311 A * | 1/1972 | Steger | 219/522 |
| 3,736,404 A * | 5/1973 | Eisler | 219/203 |
| 4,150,443 A | 4/1979 | McNeilly | |
| 4,399,347 A | 8/1983 | Schmitt | |
| 4,584,721 A | 4/1986 | Yamamoto | |
| 4,638,728 A | 1/1987 | Elenewski | |
| 4,682,007 A | 7/1987 | Hollander | |
| 4,868,929 A | 9/1989 | Curcio | |
| 4,902,879 A * | 2/1990 | Walters et al. | 219/522 |
| 5,160,827 A * | 11/1992 | Parker | 219/203 |
| D351,685 S | 10/1994 | Kamata | |
| 5,448,037 A * | 9/1995 | Takase et al. | 219/547 |
| 5,471,036 A | 11/1995 | Sperbeck | |
| 5,493,102 A * | 2/1996 | Takase et al. | 219/547 |
| 5,500,953 A | 3/1996 | Reuber et al. | |
| 5,694,650 A * | 12/1997 | Hong | 2/424 |

(Continued)

FOREIGN PATENT DOCUMENTS

| | | |
|---|---|---|
| CH | 636251 A5 | 5/1983 |
| DE | 3229021 A1 | 2/1984 |

(Continued)

*Primary Examiner* — Joseph M Pelham
(74) *Attorney, Agent, or Firm* — Barlow, Josephs & Holmes, Ltd.

(57) ABSTRACT

An anti-fogging device has a substantially transparent or optically clear plastic layer with a heater element formed of etched metallic foil bonded to it. The device has an adhesive element disposed at the periphery of the device for sticking to a viewing member such as a motorcycle helmet visor, surgical mask or rear windscreen for a convertible car, to leave a gap between the heater element and the viewing member.

10 Claims, 2 Drawing Sheets

U.S. PATENT DOCUMENTS

| | | | |
|---|---|---|---|
| 5,750,267 A * | 5/1998 | Takase et al. | 428/469 |
| 5,845,342 A | 12/1998 | Park | |
| 6,316,746 B1 | 11/2001 | Golston | |
| 6,417,491 B1 | 7/2002 | Taniuchi | |
| 6,701,537 B1 | 3/2004 | Stamp | |
| 2003/0217745 A1 | 11/2003 | Guay et al. | |
| 2005/0023264 A1 * | 2/2005 | Bartrug et al. | 219/203 |
| 2009/0199989 A1 * | 8/2009 | Zaoralek | 162/206 |

FOREIGN PATENT DOCUMENTS

| | | |
|---|---|---|
| DE | 3300183 A1 | 7/1984 |
| DE | 3719669 A1 | 12/1988 |
| DE | 29722091 U1 | 7/1998 |
| EP | 0446684 A1 | 9/1991 |
| FR | 2485614 A1 | 12/1981 |
| GB | 908353 | 10/1962 |
| GB | 1154755 A | 6/1969 |
| GB | 2081558 A | 2/1982 |
| GB | 2108808 A | 5/1983 |
| GB | 2401772 A | 11/2004 |
| IT | 1171812 B | 6/1987 |
| JP | 2001181923 A | 7/2001 |
| JP | 2002161425 A | 6/2002 |
| JP | 2002299018 A | 10/2002 |

* cited by examiner

ANTI-FOGGING DEVICE AND ANTI-FOGGING VIEWING MEMBER

BACKGROUND TO THE INVENTION

1. Field of the Invention

The present invention relates to devices for reducing or removing fogging of viewing members such as visors, windscreens and the like.

2. Related Art

It is known to heat viewing members such as motorbike helmet visors or car windscreens (windshields) in order to prevent or remove fogging (or misting) caused by the condensation of water on the cold surface of the viewing member. Typically, heat is provided to the viewing member either from a flow of heated air or by direct heating, e.g. via a resistive heater element carrying an electric current.

Fogging of such viewing members may occur due to condensation of water vapour in breath. This may dangerously restrict the vision of the user/wearer.

CH 636251 discloses a heatable visor. Resistive heating wires are located between two panes of the visor.

GB-A-2401772 discloses a heated visor for a motorbike helmet with an electric heating element embedded in the visor.

DE-A-3229021 discloses a visor heater with an electrically conductive film. The heater is fixed to the visor via slots.

IT 1171812 and U.S. Pat. No. 4,584,721 each disclose a removable heat generating plate having a transparent heat generating film. Part of the film is removed to ensure that the electrode bus leads in properly to the film.

U.S. Pat. No. 6,701,537 discloses a heater element that is removable from the visor it is intended to heat.

U.S. Pat. No. 4,150,443 discloses a fan-driven circulation of air to prevent fogging of sports goggles.

U.S. Pat. No. 4,682,007 discloses a face shield for a protective helmet having an electrically conductive heating circuit printed by screen printing on the inner surface of the face shield.

U.S. Pat. No. 4,868,929 discloses ski goggles with a fine grid of heat generating wire disposed between two layers of the lens of the goggles.

U.S. Pat. No. 5,500,953 discloses a face shield for a helmet. The face shield has an inner face lens and an outer weather lens. An electroconductive film is formed across the entire surface of the inner face lens, to be heated by an electric current.

U.S. Pat. No. 5,471,036 discloses a visor with a transparent coating of conductive film (indium tin oxide) applied. The edges of the film are etched away to prevent electrical contact with the frame of the visor.

The transparent heating films of the prior art have the disadvantage that they must be very thin to be transparent enough to allow a user to see through them. However, in order to provide a useful heating effect, they must carry significant electrical current. This may require a high voltage, which is not desirable.

Furthermore, the heating elements of the prior art are liable to be damaged (e.g. by overheating or scratching) to the extent that the heating functionality of the element may be impaired. This necessitates costly replacement of the visor or other viewing member.

It is also known to provide motorcycle helmet accessories in the form of thin transparent sheets of plastics material having a surface coating of a type that discourages the formation of water droplets on the surface that together cause fogging. Such accessories do not, therefore, prevent the condensation of water on the surface but instead modify the nature of the condensed water to reduce fogging. For such accessories that allow the formation of larger water droplets, these can act like small lenses to distort the image viewed through a motorcycle helmet visor, especially in dark viewing conditions. A further problem with such accessories is that, by definition, the active surface must be exposed. Consequently, there is a serious risk that the active surface with be scratched or abraded during use, reducing its effectiveness in reducing fogging.

SUMMARY OF THE INVENTION

The present invention has been devised in order to address, avoid or even overcome at least one of the above problems.

Accordingly, in a first aspect, the present invention provides an anti-fogging device having a first flexible sheet of substantially transparent material, a heater element formed on or at the flexible sheet and an adhesive element disposed at the periphery of the device for adhering the device to a viewing member.

In this way, the attachment of the device to the viewing member via the adhesive element allows the flexible sheet and the heater element to be separated from the viewing member by a gap corresponding to the thickness of the adhesive element, or corresponding to the difference in shape between the device and the viewing member. This allows the heating of the viewing member itself by the heater element to be limited. Accordingly, heating of the heater element primarily heats the flexible sheet in order to render the flexible sheet less prone to fogging or misting. Additionally, the separation of the device from the viewing member allows the avoidance of damage to the viewing member by rubbing or scratching.

The heater element may be formed in a track or pattern. Typically, this allows the use of a heater element material that itself is not light-transmissive, but the spaces between adjacent parts of the heater element allowing the heater element substantially not to interfere with the view of the user.

The adhesive element is preferably an upstanding adhesive element, standing proud of the flexible sheet. The thickness of the adhesive element may be about 0.3 mm or more, e.g. about 0.5 mm, or possibly 0.7 mm or more, e.g. about 1 mm. Preferably, the adhesive element is formed of a material of low thermal conductivity in order to reduce heat loss from the device and subsequent heat flow to the viewing member. The adhesive element may be formed of a cellular material, such as a foam, with an adhesive coating. The adhesive may be an impact or pressure adhesive. The adhesive element may be formed from double-sided adhesive material, one side of the adhesive bonding to the device.

The adhesive element may be provided in a single section or in two or more sections. Preferably, the adhesive element extends substantially all the way around the perimeter of the device. In this way, it is possible to obtain a substantially sealed gap between the device and the viewing member. This is advantageous because air containing large amounts of water vapour (e.g. breath) may then be substantially prevented from entering the gap between the device and the viewing member.

The adhesive element may be formed by cutting a suitable shape from an adhesive element blank. Preferably, this is done by cutting an aperture in the blank (e.g. by die cutting) to provide a continuous adhesive element with an outer shape substantially corresponding to the outer shape of the flexible sheet. The aperture in the blank preferably is sized to be able to fit within it at least a major portion of the heater element shape.

Preferably, the outer shape of the adhesive element is not cut until the apertured adhesive element blank is assembled on the device. In that case, the outer shape of the adhesive element and the flexible sheet or sheets is cut at the same time. This provides a uniform and accurate finish to the device.

The heater element may be an etched heater element track. The etched heater element may be bonded to the flexible sheet via an adhesive layer. The heater element may be formed by bonding a metallic foil to the flexible sheet via the adhesive layer and subsequently etching that foil to the desired track pattern.

Foil is economically viable for use with the present invention due to its relatively low cost. Furthermore, foil is available in various thicknesses, and the thickness of a particular foil can be accurately controlled during manufacture so that the final form of the heating element can have uniform heating properties. Thus, accurate control over element properties and shape may be achieved.

Alternatively, the heater element may be formed from an electrically conductive coating material. The coating of conductive material may be applied to the flexible layer of substantially transparent (preferably optically clear) material by known thin film deposition techniques (e.g. sputtering). The coating may then be etched to form the desired pattern.

Similarly, the heating element may be formed from an electrically conductive coating material, however the heating element does not necessarily need to be etched when it is formed on the flexible layer. Alternatively, the coating of the electrically conductive material may be applied to the flexible layer using a mask and a thin film deposition technique. After the conductive coating material has been deposited on the flexible layer and the mask, the mask is removed to reveal the heating element with the desired pattern of the heating element.

The heater element may alternatively be formed by printing printable electrically conductive coating material on the flexible layer.

Alternatively, the heater element may be formed from a wire bonded to the flexible sheet. The wire may be bonded on the surface of the flexible sheet or incorporated within the flexible sheet.

Preferably, the device includes a second substantially transparent (preferably optically clear) flexible sheet. This second flexible sheet may be bonded to the etched heater element, thus cooperating with the first flexible sheet to sandwich the heater element. This provides protection to the heater element. Most preferably the first and second flexible sheets are laminated together using an adhesive layer between them. Preferably, the adhesive layer thickness is at least 15 µm, but it is more preferably at least 30 µm or at least 45 µm to promote adhesive flow during lamination to reduce optical distortion in the finished product.

Preferably, after installation and use of the device, it is subsequently removable, e.g. in the event that the heating element is damaged or deteriorates during use. For example, the device may be disposable.

The adhesive layer between the heater element and the flexible sheets is preferably heat-resistant.

In the context of visors, the invention is of relevance to helmet visors (e.g. for motorbikes) but fogging can be an issue whenever eye protection or coverage is worn (e.g. surgical masks, diving and sports goggles, safety glasses, face shields, etc.). The attachment of the device via adhesive to the material of the visor typically causes no stress to the visor. In fact such attachment may contribute to preventing splintering of the material, since the adhesive and flexible layer may have a retentive effect on any shards.

The present invention may therefore provide an accessory for a visor. Most preferably, the accessory may be applied to many different types and shapes of visor.

Previous attempts to address the problem of fogging of visors have concentrated on building heater elements into the visor material itself. This can reduce the impact strength of the visor. Further, such arrangements can have a high current consumption due to the typically high thickness (and thus heat capacity) of visor material to be heated. Furthermore, this requires a unique visor for each helmet of interest whereas the accessory of the present invention may be applied to many different types and shapes of visors.

The flexible sheet of substantially transparent material is preferably a plastic film. More preferably, it is an optically clear film. As will be understood by the skilled person, the application of an adhesive layer to the plastic film may deteriorate slightly the optical clarity of the film. However, in preferred embodiments, the heater element is laminated between two such films, and the lamination process preferably causes the adhesive film to flow, thereby improving the optical clarity of the whole structure. The device is preferably shaped so as to be attached to the inside of an existing visor.

In use, a small electrical current is passed though the heater element so as to raise the temperature of the flexible sheet, such that the wearer's breath does not condense on it. In other words, the heater element forms a heated barrier between the helmet visor and the wearer's breath. This keeps the device at a temperature above the dew point, to eliminate, or substantially reduce, fogging or the formation of larger water droplets on the surface of the device or the visor itself. Thus, the problem of distortion from larger water droplets is reduced or eliminated.

A further advantage of the present invention is that the device is separated from the visor and thus the heating element is required to heat only the flexible sheet of the device, and not the visor. The flexible sheet typically has a much lower thickness than the visor, and thus a lower heat capacity than the visor. Thus, the power required by the heating element to heat the flexible sheet is typically lower than that required by heating elements mounted in contact with, or within, a visor.

The device preferably includes terminal portions for the heater element. These terminal portions may be connected to a power supply via known electrical connectors.

Preferred and/or optional aspects of the invention are set out below with respect to other aspects of the invention. These may be combined with the first aspect of the invention or with any preferred and/or optional feature of the first aspect of the invention.

In a second aspect, the present invention provides a kit for modifying a viewing member including an anti-fogging device according to the first aspect.

Preferably, the anti-fogging device has a backing sheet for covering the adhesive element. In use, the backing sheet may be removed from the adhesive element before application of the device to the viewing member. Thus, the kit may allow the adhesive to remain covered (and therefore retain a high level of adhesibility) until just before use of the device. The kit may therefore provide a simple DIY application of the device using a peel and stick approach.

The kit may include one or more electrical leads for connection to one or more respective terminal portions of the heater element track. The electrical leads may terminate in one or more suitable plug members for attachment to a power source. Typically, the device is switched on or off by physically attaching the device to the power supply (e.g. by pushing a jack plug into a power supply socket). The kit may further include power indication means for indicating when power is being supplied to the device. The indication means may, for example, be a visual indication means such as an LED.

It is preferred that, in the case of use of the device on a viewing member worn by a user (e.g. a visor of a motorcycle helmet), the connection of the device to the power supply is disconnectable in the event of an accident (e.g. the user falling from a motorcycle). This may be achieved using the power jack and socket arrangement described above.

The power supply to the heater element may be directly from a vehicle battery (in the case of a viewing member for a vehicle such as a motorcycle helmet visor or a windscreen). Alternatively the power supply may be via a vehicle alternator where no connection to a battery is possible or desirable. Preferably power is supplied via a frangible fuse. The kit of the second aspect may include the power supply and/or fuse.

The material used for the heater element preferably has a high positive temperature coefficient. In this way, changes in loading of the wires of the element (grid) such as those caused by possible short circuits, which may also cause the temperature of the element to rise, will also then cause the resistivity of the material to rise and hence the current is self-limiting. In the case of a visor, there is then no hazard to the wearer's face. The frangible fuse (if provided) is provided as a final safeguard.

The heater element is preferably provided with a small cross sectional area. Preferably, the width of the element track is 1 mm or less, more preferably 0.5 mm or less, still more preferably 0.2 mm or less. When the element is close to the eye (e.g. when it is used on a visor), persistence of vision means that the element is not noticeable by the user.

Preferably, the heater element is formed in a curved shape, e.g. in a curved waveform shape such as a sinusoidal shape. This reduces the impact on the vision of the user.

The device may be operable over a range of electric currents. Preferably, a current in the range of 0.1 to 3 amps is used. The selection of current will depend upon the material used for the heater element and upon the intended application of the device. More preferably, a current is used that is 0.3 amps or higher and/or 0.7 amps or lower, e.g. about 0.5 amps.

Preferably, the element track has a flattened cross-sectional shape. This minimises the thickness of the device and therefore reduces the likelihood of thermal contact with the material of the viewing member (e.g. visor).

In a third aspect, the present invention provides a viewing member having an anti-fogging device according to the first aspect installed on it.

Preferably, the viewing member is one intended for fitting to a user's head. For example, the viewing member may be one of a motorcycle helmet visor, a full face surgical mask such as an orthopaedic full face surgical mask, a car or motor racing helmet, ski goggles/mask, snowmobile visor, a viewing lens such as in spectacles or safety spectacles, a mining mask, scuba diving mask or gas mask.

Alternatively, the viewing member may be one which is intended for location further from a user. For example, the viewing member may be one of a vehicle windscreen or a window. For example, a flexible rear windscreen may be provided (e.g. for a convertible car) incorporating an anti-fogging device according to the first aspect.

Typically, a plastic rear window that is prone to steaming up in cold weather has been replaced for a heated glass rear window. This has the disadvantage that the fixing system is complicated and the glass structure is expensive (safety glass is used) and is also bulky.

Thus, the invention may provide the application of an anti-fogging device to a normal rear window plastic sheet of a convertible car. Thus, the invention may provide a light weight, shatter proof, cheap alternative to glass.

Typically, the tracks of the element for such an anti-fogging member are spaced apart in the vision area (i.e. at the centre of the field of view) of the viewing member at a pitch of between 0.5-2 cm, preferably about 1 cm (10 mm). The element is preferably adapted to provide a power density of about 5-250 watts per square foot. The element resistance may be selected according to the application, in order to provide the required power density. More preferably, the device is adapted to provide a power density in the range 30 to 120 watts per square foot (e.g. 36 to 108 watts per square foot).

The power supply to the anti-fogging member is typically already present in a car as a dedicated heated rear screen power supply.

In another aspect, the present invention provides a method for manufacturing an anti-fogging device according to the first aspect and/or a method for installing such a device on a viewing member.

BRIEF DESCRIPTION OF THE DRAWINGS

Preferred embodiments of the invention will now be described, by way of example, with reference to the accompanying drawings, in which.

DESCRIPTION OF THE PREFERRED EMBODIMENTS

The preferred embodiments of the invention will first be described with reference to a device for reducing or preventing fogging of a visor of a motorcycle helmet.

Figure 1:
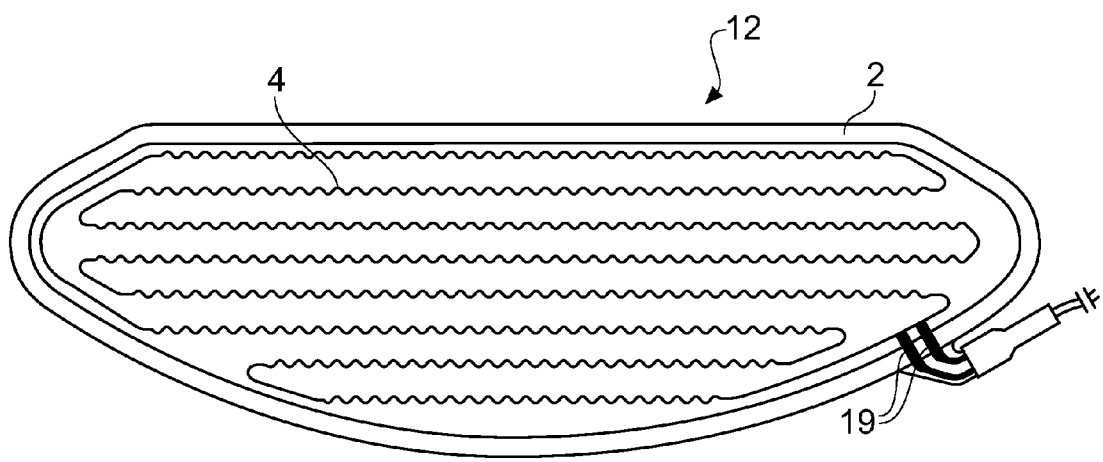
FIG. 1 shows a plan view of an anti-fogging device according to an embodiment of the invention.

FIG. 1 shows a plan view of an anti-fogging device 12 of the present invention, for use on a motorcycle visor. The anti-fogging device 12 has a continuous adhesive pad 2 disposed at its perimeter. This adhesive pad is the preferred form of the adhesive element discussed above. The outer edges of the continuous adhesive pad are coterminous with the outer edges of the device.

The device has a heating element 4 which is in the form of a continuous track having a meandering pattern so that adjacent portions of the track are separated by a distance of between 0.5-2 cm, typically about 1 cm, at the vision area of the viewing member. The element is adapted to provide a power density of typically 36-108 watts per square foot. The element resistance may be selected according to the application, in order to provide the required power density.

The heating element 4 has a track width of typically 0.145 mm to ensure that it does not significantly obscure the view of the user when looking through the device. Ideally persistence of vision will mean that the heating element 4 will not be apparent to the user when the device is viewed at close range during use. The heating element 4 also has a small thickness to reduce the overall thickness of the device, as described in further detail below.

The heating element 4 also has terminal portions 19 for the attachment of known electrical connectors.

Figure 2:
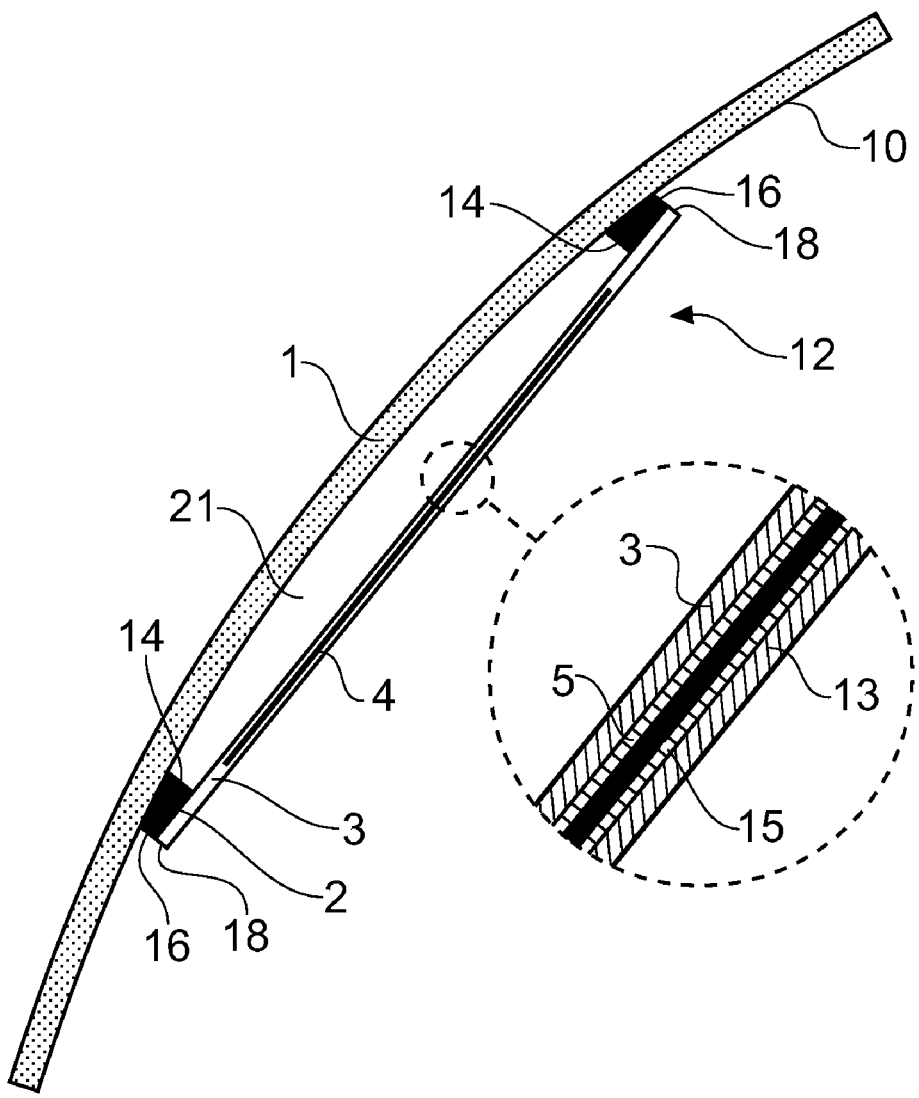
FIG. 2 shows a schematic cross-sectional view of a motorcycle helmet visor having an anti-fogging device according to an embodiment of the invention mounted on the visor.

FIG. 2 shows a cross sectional view of a motorcycle visor 1 (the remainder of the motorcycle helmet is not shown). The visor is typically formed of polycarbonate material. The visor has, at its internal surface 10, the anti-fogging device shown in FIG. 1 attached via the continuous adhesive pad 2.

The device has a base sheet 13 of optically clear material, such as Part No. 923-04-45 available from GTS Flexible Materials Limited (of Ebbw Vale, Gwent, NP23 5SD, U.K.). This is an optically clear, low-shrink polyester sheet of thickness 125 μm with a thermoplastic polyester-based adhesive coating 15 of thickness 15 μm and with an electrodeposited copper foil of thickness 18 μm bonded via the adhesive coating 15. The copper foil is then preferentially etched to form a resistive heating element 4 of a desired shape, such as that shown in FIG. 1. Suitable etching processes will be known to the skilled person.

The device has a cover sheet 3 of optically clear material, such as Part No. 923-04-44 available from GTS Flexible Materials Limited (of Ebbw Vale, Gwent, NP23 5SD, U.K.). This is an optically clear, low-shrink polyester sheet of thickness 125 μm with a thermoplastic polyester-based adhesive coating 5 of thickness 25 μm. Further preferred embodiments may use thicker adhesive coatings 5 and/or 15.

Cover sheet 3 is applied over the etched heating element. The cover sheet 3 and base sheet 13 are then laminated using heat and pressure. Adhesive coatings 5 and 15 flow due to the lamination conditions. The thicker coating 5 flows to ensure a good bond between the base sheet and cover sheet. This flowing of the adhesive coatings tends to improve the optical clarity of the final product compared with the clarity of the product before lamination.

The adhesive pad 2 is formed from product 4905F (0.5 mm thick) or product 4910F (1.0 mm thick) supplied by 3M. The adhesive pad blank (not shown) has inner and outer release sheets (not shown) of thickness about 0.13 mm. Before either of these release sheets is removed, the blank is die-cut to form an aperture in the blank, providing the remaining part of the adhesive blank with an inside wall surface 14. The cut blank is then adhered to the flexible laminate of sheets 3, 13 and heater element 4 by removal of one of the release sheets from the cut adhesive blanks. The cut adhesive blank is placed over the flexible laminate with the inside wall surface of the cut adhesive blank not overlying the heater element but circumscribing it (not including the terminal portions 19 of the heater element, which project outwardly from the laminate). Pressure is applied to activate the impact adhesive layer of the cut adhesive blank.

The combination of the flexible laminate and the cut adhesive blank is then die-cut to form the outer shape of the device. In this way, both the adhesive blank and the laminate are cut in the same process, so the outer wall 16 of the adhesive pad and the outer wall 18 of the flexible laminate are coterminous.

The device is applied to the inner surface of a visor (typically by the user) by removal of the outer release paper from the adhesive pad and pressing the device to the visor to activate the impact adhesive layer on the adhesive pad. The adhesive pad, being formed of foam material, conforms to the shape of the visor. The thickness of the adhesive pad and the curvature of the visor combine to ensure that there is an air gap 21 between the inner surface of the visor and the laminate. Furthermore, the adhesive pad extends all the way around the periphery of the device, so that the bonding of the adhesive pad to the visor form a substantially sealed space between the device and the visor.

In an alternative, preferred embodiment, the adhesive coating 5 on the cover sheet 3 and/or the adhesive coating 15 on the base sheet 13 has a thickness of about 45 μm. This is a suitable thickness to allow the adhesive to flow to a satisfactory extent when laminated using heat and pressure, so that low optical distortion is achieved.

In use, the heater is activated by causing an electric current of between 0.3 to 0.7 amps to flow through the resistive heater element, this warming the laminate. The laminate, being relatively thin, has a low heat capacity and thus heats quickly. Fogging or misting of the surface facing the user is prevented or reduced due to the temperature of the laminate. The visor itself is not heated significantly, due to the air gap 21 and due to the low thermal conductivity of the adhesive pad 2. In any event, it is not necessary to heat the visor, since the user's breath is prevented from reaching the inner surface of the visor by adhesive pad 2.

The desired track pattern is photochemically etched from the conductive layer. This is done by first designing and generating a suitable phototool, in a way well known to the skilled person. Next, the foil-sheet laminate is mounted onto a hinged frame of brown styrene board, so that the otherwise flimsy flexible laminate can be more readily handled. The foil side of the laminate is then cleaned with a commercial surface cleaning agent to assist in the adhesion of the photoresist. Then, the photoresist is applied to the laminate, ensuring uniform application to all parts of the laminate. This can be achieved by using any conventional photoresist application technique such as liquid application by dip-coating, or dry film application by hot roll laminator.

Next, the laminate is exposed to a suitable image pattern of ultraviolet light from the phototool. This image is developed. The metal between the tracks of the required pattern is then progressively etched away. Then, the photoresist is removed to leave the required metallic track shape for the heater element. These steps will be clear to the skilled person.

As will be clear to the skilled person, a similar route can be undertaken to provide anti-fogging devices for other viewing members such as car front or rear windscreens, surgical masks, goggles, scuba diving masks and other such articles.

The above embodiments have been described by way of example. Modifications of these embodiments, further embodiments and modifications thereof will be apparent to the skilled person and as such are within the scope of the invention.

The invention claimed is:

1. An anti-fogging device having a laminated sandwich construction, comprising:
   a first flexible sheet of substantially transparent material;
   a second flexible sheet of substantially transparent material;
   a heater element interposed between the first and second flexible sheets; the first and second sheets being laminated together with the heater element sandwiched therebetween to provide a laminated member; the heater element itself not being light-transmissive;
   an adhesive layer of thickness at least 15 μm interposed, with the heater element, between the first and second flexible sheets;
   an upstanding adhesive element extending outwardly from one of the flexible sheets and disposed substantially all the way around and on a periphery of the laminated member for adhering the the laminated member to a viewing member thereby defining an air gap between the viewing member and the laminated member; and
   a releasable backing sheet covering a portion of the upstanding adhesive element not disposed on the laminated member.

2. An anti-fogging device according to claim 1 wherein the heater element is an etched heater element track formed on one of the flexible sheets.

3. An anti-fogging device according to claim 1 wherein the heater element is a wire bonded to one of the flexible sheet sheets.

4. An anti-fogging device according to claim 1 wherein the heater element is printed on one of the flexible sheet sheets.

5. An anti-fogging device according to claim 1 wherein the heater element is deposited using mask and a film formation technique on one of the first and second flexible sheets.

6. An anti-fogging device according to claim 1 wherein the upstanding adhesive element is formed of a cellular material with an adhesive coating.

7. An anti-fogging device according to claim 1 wherein the heater element is formed in a curved waveform shape.

8. A kit for modifying a viewing member including an anti-fogging device having a first flexible sheet of substantially transparent material, a heater element, a second flexible sheet of substantially transparent material, the heater element being interposed between the first and second flexible sheets and the heater element itself not being light-transmissive, there being an adhesive layer of thickness at least 15 μm between the first and second flexible sheets and an adhesive element disposed at a periphery of the device for adhering the device to a viewing member, wherein the heater element is selected from the group consisting of: an etched heater element track formed on one of the flexible sheets; a heater element wire bonded to one of the flexible sheet sheets; a heater element printed on one of the flexible sheet sheets; and a heater element deposited using mask and a film formation technique on one of the flexible layer sheets, and wherein the adhesive element is an upstanding adhesive element, extending outwardly from and attached to one of the flexible sheet sheets thereby defining an air gap between one of the flexible sheets upon which the adhesive member is attached and the viewing member, the adhesive element being formed of a cellular material with an adhesive coating and extending substantially all the way around the periphery of the device; a releasable backing sheet covering a portion of the upstanding adhesive element not attached to one of the flexible sheets.

9. A kit according to claim 8 including one or more electrical leads for connection to one or more respective terminal portions of the heater element, said terminal portions being defined by respective free ends of the heater element.

10. The kit of claim 8, wherein the heater element is formed in a curved waveform shape.

* * * * *